US008304513B2

(12) United States Patent
Drysdale et al.

(10) Patent No.: US 8,304,513 B2
(45) Date of Patent: Nov. 6, 2012

(54) POLYESTERS COMPRISING FLUOROVINYLETHER FUNCTIONALIZED AROMATIC MOIETIES

(75) Inventors: Neville Everton Drysdale, Newark, DE (US); Surbhi Mahajan, Newark, DE (US); Kenneth Gene Moloy, Hockessin, DE (US); Fredrik Nederberg, Greenville, DE (US); Joel M. Pollino, Elkton, MD (US); Joachim C. Ritter, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 226 days.

(21) Appl. No.: 12/873,428

(22) Filed: Sep. 1, 2010

(65) Prior Publication Data

US 2011/0218317 A1   Sep. 8, 2011

Related U.S. Application Data

(60) Provisional application No. 61/239,085, filed on Sep. 2, 2009, provisional application No. 61/239,101, filed on Sep. 2, 2009.

(51) Int. Cl.
*C08G 73/24* (2006.01)
(52) U.S. Cl. ........ 528/401; 528/299; 528/370; 528/372; 528/397; 525/276; 560/8; 560/47; 560/54; 560/100; 560/111; 562/400; 570/101; 570/138; 428/40.7; 428/421; 428/422
(58) Field of Classification Search .......... 528/271, 528/272, 299, 308.3, 370, 372, 397, 401, 528/402; 525/50, 276; 560/1, 8, 47, 54, 560/55, 60, 62, 63, 100, 111; 562/400, 405, 562/465, 470, 472, 475, 481, 840, 855, 856, 562/860, 861; 570/101, 122, 123, 124, 125, 570/126, 127, 129, 130, 131, 135, 136, 138, 570/163, 257; 428/40.1, 40.6, 40.7, 411.1, 428/421, 422
See application file for complete search history.

(56) References Cited

U.S. PATENT DOCUMENTS

| 4,219,625 | A  | 8/1980  | Mares et al.    |
| 4,841,093 | A  | 6/1989  | Tamaru et al.   |
| 5,091,456 | A  | 2/1992  | Rodini          |
| 5,104,961 | A  | 4/1992  | Muller          |
| 5,243,019 | A  | 9/1993  | Takeda et al.   |
| 5,349,093 | A  | 9/1994  | Oka et al.      |
| 5,468,882 | A  | 11/1995 | Schohe-Loop et al. |
| 5,756,814 | A  | 5/1998  | Lin et al.      |
| 6,734,227 | B2 | 5/2004  | Jing et al.     |
| 6,790,898 | B2 | 9/2004  | Lee et al.      |
| 6,960,642 | B2 | 11/2005 | Jariwala et al. |
| 7,202,324 | B2 | 4/2007  | Kim et al.      |
| 7,446,127 | B2 | 11/2008 | Choi et al.     |
| 7,825,280 | B2 | 11/2010 | Saegusa et al.  |

| 2002/0042526 | A1 | 4/2002  | Piscopio et al. |
| 2003/0001130 | A1 | 1/2003  | Qiu             |
| 2004/0235685 | A1 | 11/2004 | Russo et al.    |
| 2008/0020148 | A1 | 1/2008  | Klein et al.    |
| 2008/0039558 | A1 | 2/2008  | Lazzari et al.  |

FOREIGN PATENT DOCUMENTS

| EP | 1616849     | A2 | 1/2006  |
| JP | 62197419    | A  | 9/1987  |
| JP | 62205181    | A  | 9/1987  |
| JP | 1249747     | A  | 11/1989 |
| JP | 5294903     | A  | 11/1993 |
| JP | 1017522     | A  | 1/1998  |
| JP | 2005120001  |    | 5/2005  |
| KR | 1020030046554 | A | 6/2003  |
| KR | 1020040006591 | A | 1/2004  |
| WO | 9967304     | A1 | 12/1999 |
| WO | 2006043501  | A1 | 4/2006  |

OTHER PUBLICATIONS

Feiring et al, "Synthesis of Arylperfluoroalkyl Ethers by Direct Fluorination", Journal of Fluorine Chemistry, 89 (1998), pp. 31-34.*
Feiring et al, "Novel Aromatic Polymers with Pendant Lithium Perfluoroalkylsulfonate or Sulfonimide Groups", Macromolecules 2000, 33, pp. 9262-9271.*
International Search Report, Related PCT International Application No. PCT/US2010/047472 Mailed May 30, 2011, Neville Everton Drysdale, Filed Sep. 1, 2010).
International Search Report, Related PCT International Application No. PCT/US2010/047514 Mailed May 18, 2011, Neville Everton Drysdale et al., Filed Sep. 1, 2010).
International Search Report, Related PCT International Application No. PCT/US2010/047480 Mailed May 18, 2011, Neville Everton Drysdale et al., Filed Sep. 1, 2010).
Related PCT International Application No. PCT/US2010/049962, Neville Everton Drysdale, Filed Sep. 23, 2010).
International Search Report, Related PCT International Application No. PCT/US2010/047473 Mailed March 17, 2011, Neville Everton Drysdale et al., Filed Sep. 1, 2010).
JP2005-120001, Machine Translation, Thomson Innovation (WWW.THOMSONINNOVATION.COM, Sep. 26, 2011).
JP62-197491A, Machine Translation of Abstract Only (WWW.WORLDWIDE.ESPACENET.COM, Sep. 26, 2011).
JP62-205181A, Machine Translation of Abstract Only (WWW.WORLDWIDE.ESPACENET.COM, Sep. 26, 2011).
JP12-49747, Machine Translation of Abstract Only (WWW.WORLDWIDE.ESPACENET.COM, Sep. 26, 2011).
JP52-94903A, Machine Translation of Abstract Only (WWW.WORLDWIDE.ESPACENET.COM, Sep. 26, 2011).
Co-pending U.S. Appl. No. 12/873,392, Neville Everton Drysdale, filed Sep. 1, 2010.
Co-pending U.S. Appl. No. 12/873,396, Neville Everton Drysdale, filed Sep. 1, 2010.

(Continued)

*Primary Examiner* — Frances Tischler

(57) ABSTRACT

Disclosed are polyesters, particularly poly(trimethylene terephthalate), comprising fluorovinylether functionalized aromatic repeat units, and methods to make the polyester polymers. The polymers are useful for imparting soil resistance to polyesters, particularly in the form of fibers, fabrics, and carpets.

37 Claims, No Drawings

OTHER PUBLICATIONS

Co-pending U.S. Appl. No. 12/873,402, Neville Everton Drysdale, filed Sep. 1, 2010.
Co-pending U.S. Appl. No. 12/873,418, Neville Everton Drysdale, filed Sep. 1, 2010.
Co-pending U.S. Appl. No. 12/873,423, Neville Everton Drysdale, filed Sep. 1, 2010.
Feiring, A.E. et al., Aromatic Monomers with Pendant Fluoroalkylsulfonate and Sulfonimide Groups, Journal of Fluorine Chemistry 105(2000), pp. 129-135.
ASTM International, Designation: E29-08, Standard Practice for Using Significant Digits in Test Data to Determine Conformance with Specifications, pp. 1-5, 2008.

* cited by examiner

POLYESTERS COMPRISING FLUOROVINYLETHER FUNCTIONALIZED AROMATIC MOIETIES

FIELD OF THE INVENTION

The invention is directed to polyester polymers, particularly poly(trimethylene terephthalate), comprising fluorovinylether functionalized aromatic repeat units, and methods to make the polyester polymers. The polymers are useful for imparting soil resistance to polyesters, particularly in the form of fibers, fabrics, and carpets.

BACKGROUND

Fluorinated materials have many uses. In particular, they are used in polymer-related industries, and, more particularly, in fiber-related industries, to impart soil and oil resistance. Generally, these materials are applied as a topical treatment, but their effectiveness decreases over time due to material loss via wear and washing.

There is a need to provide polymeric materials that have improved soil and oil resistance.

SUMMARY OF THE INVENTION

In one aspect, the invention provides a polymer comprising a fluorovinyl ether functionalized aromatic repeat unit represented by the structure (I)

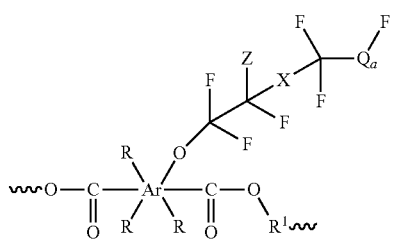

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

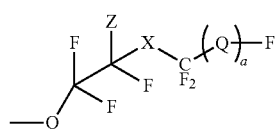

with the proviso that only one R can be OH or the radical represented by the structure (II);
R1 is a C2-C4 alkylene radical which can be branched or unbranched,
X is O or $CF_2$;
Z is H, Cl, or Br;
a=0 or 1;
and,
Q represents the structure (Ia)

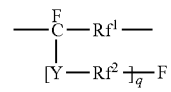

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

In another aspect, the present invention provides a process, comprising combining a fluorovinyl ether functionalized aromatic diester or diacid with a $C_2$-$C_4$ alkylene glycol, branched or unbranched, and a catalyst to form a reaction mixture, stirring the reaction mixture to form a polymer comprising repeat units having the structure (I), wherein the fluorovinyl ether functionalized aromatic diester or diacid is represented by the structure (III),

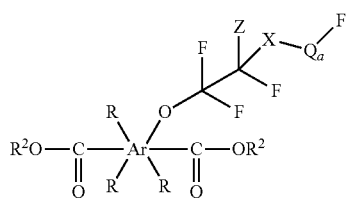

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

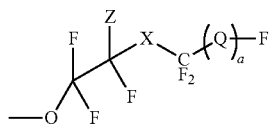

with the proviso that only one R can be OH or the radical represented by the structure (II);
$R^2$ is H or $C_1$-$C_{10}$ alkyl;
X is O or $CF_2$;
Z is H, Cl, or Br;
a=0 or 1;
and,
Q represents the structure (Ia)

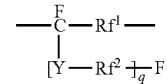

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

DETAILED DESCRIPTION

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

The parameters n, p, and q as employed herein are each independently integers in the range of 1-10.

As used herein, the term "fluorovinyl ether functionalized aromatic diester" refers to that subclass of compounds of structure (III) wherein $R^2$ is $C_1$-$C_{10}$ alkyl. The term "fluorovinyl ether functionalized aromatic diacid" refers to that subclass of compounds of structure (III) wherein $R^2$ is H. The term "perfluorovinyl compound" refers to the olefinically unsaturated compound represented by structure (VII), infra.

As used herein, the term "copolymer" refers to a polymer comprising two or more chemically distinct repeat units, including dipolymers, terpolymers, tetrapolymers and the like. The term "homopolymer" refers to a polymer consisting of a plurality of repeat units that are chemically indistinguishable from one another.

In any chemical structure herein, when a terminal bond is shown as "—", where no terminal chemical group is indicated, the terminal bond "—" indicates a radical. For example, —$CH_3$ represents a methyl radical.

In one aspect, the present invention provides a polymer comprising a fluorovinyl ether functionalized aromatic repeat unit represented by the structure (I).

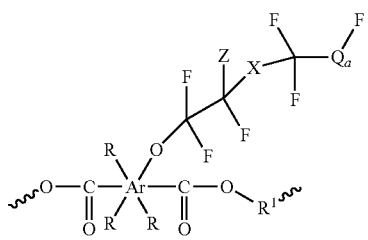

I wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

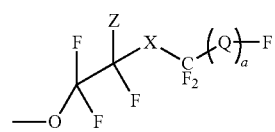

II with the proviso that only one R can be OH or the radical represented by the structure (II);

R1 is a C2-C4 alkylene radical which can be branched or unbranched,
X is O or $CF_2$;
Z is H, Cl, or Br;
a=0 or 1;
and,
Q represents the structure (Ia)

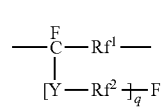

Ia wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

As can be noted in the formulas above that show substituents attached to aromatic rings "Ar", the substituents can be attached to the aromatic rings at any point, thus making it possible to have ortho-, meta- and para-substituents as defined above.

In one embodiment of the polymer, one R is OH.
In one embodiment of the polymer, each R is H.
In one embodiment of the polymer, one R is OH and the remaining two Rs are each H.
In one embodiment of the polymer, one R is represented by the structure (II) and the remaining two Rs are each H.
In one embodiment of the polymer, $R^1$ is an ethylene radical.
In one embodiment of the polymer, $R^1$ is a trimethylene radical, which can be branched.
In one embodiment of the polymer, $R^1$ is a tetramethylene radical, which can be branched.
In one embodiment of the polymer, X is O. In an alternative embodiment, X is $CF_2$.
In one embodiment of the polymer, Y is O. In an alternative embodiment, Y is $CF_2$.
In one embodiment of the polymer Z is Cl or Br. In a further embodiment, Z is Cl. In an alternative embodiment, one R is represented by the structure (II), and one Z is H. In a further embodiment, one R is represented by the structure (II), one Z is H, and one Z is Cl.
In one embodiment of the polymer, $Rf^1$ is $CF_2$.
In one embodiment of the polymer, $Rf^2$ is $CF_2$.
In one embodiment of the polymer, $Rf^2$ is a bond (that is, p=0), and Y is $CF_2$.
In one embodiment, a=0.
In one embodiment, a=1, q=0, and n=0.
In one embodiment of the polymer, each R is H, Z is Cl, $R^1$ is methoxy, X is O, Y is O, $Rf^1$ is $CF_2$, and $Rf^2$ is perfluoropropenyl, and q=1.
In one embodiment of the polymer, the polymer of the invention is a homopolymer.
In one embodiment, the polymer is a copolymer made up of repeat units that are different embodiments of structure (I); that is, different repeat units that are still represented by embodiments of structure (I). The copolymer can thus contain repeat units of structure (I) that are the same or different.
In one embodiment the specific repeat unit represented by structure (I) is represented by the structure (IVa)

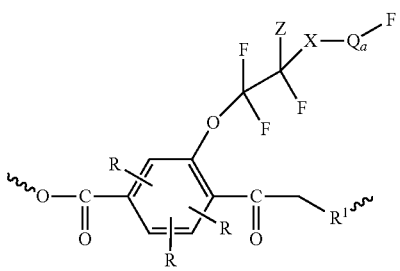

wherein R, R¹, Z, X, Q, and a are as stated supra.

In one embodiment the specific repeat unit represented by structure (I) is represented by the structure (IVb)

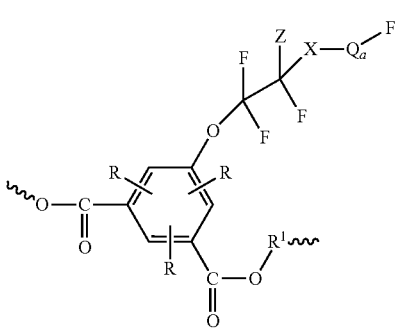

wherein R, R¹, Z, X, Q, and a are as stated supra.

In an alternative embodiment, the polymer is a copolymer comprising fluorovinyl ether functionalized aromatic repeat units represented by the structure (IVa) and fluorovinyl ether functionalized aromatic repeat units represented by the structure (IVb). In one embodiment, the copolymer is a random copolymer. In one embodiment, the copolymer is a block copolymer.

In another embodiment the polymer is a copolymer comprising arylate repeat units represented by the structure (V),

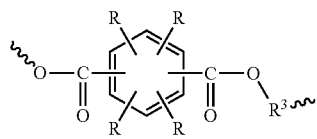

wherein each R is independently H or alkyl, and $R^3$ is $C_2$-$C_4$ alkylene which can be branched or unbranched. In one embodiment, all the Rs are H, and $R^3$ is trimethylene. In one embodiment, the repeat unit represented by structure (V) is a terephthalate radical. In an alternative embodiment, the repeat unit represented by the structure is an isophthalate radical.

In an alternative embodiment, the polymer is a copolymer comprising terephthalate repeat units and isophthalate repeat units represented by the structure (V). In one embodiment, the copolymer is a random copolymer. In one embodiment, the copolymer is a block copolymer.

In another aspect, the present invention provides a process, comprising combining a fluorovinyl ether functionalized aromatic diester or diacid with an excess of $C_2$-$C_4$ alkylene glycol or a mixture thereof, branched or unbranched, and a catalyst to form a reaction mixture. The reaction can be conducted in the melt, preferably within the temperature range of 180 to −240° C., to initially condense either methanol or water, after which the mixture can be further heated, preferably to a temperature within the range of 210 to −300° C., and evacuated, to remove the excess $C_2$-$C_4$ glycol and thereby form a polymer comprising repeat units having the structure (I), wherein the fluorovinyl ether functionalized aromatic diester or diacid is represented by the structure (III),

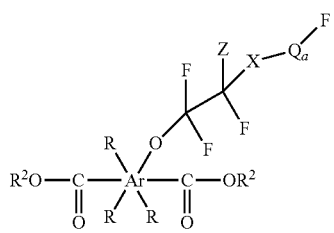

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

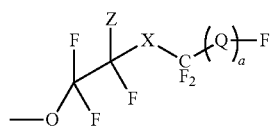

with the proviso that only one R can be OH or the radical represented by the structure (II);
$R^2$ is H or $C_1$-$C_{10}$ alkyl;
X is O or $CF_2$;
Z is H, Cl, or Br;
a=0 or 1;
and,
Q represents the structure (Ia)

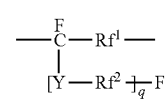

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$. In some embodiments, the reaction is carried out at about the reflux temperature of the reaction mixture.

In one embodiment of the process, one R is OH.
In one embodiment of the process, each R is H.
In one embodiment of the process, one R is OH and the remaining two Rs are each H.
In one embodiment of the process, one R is represented by the structure (II) and the remaining two Rs are each H.
In one embodiment of the process, $R^2$ is H.
In one embodiment of the process, $R^2$ is methyl.

In one embodiment of the process, X is O. In an alternative embodiment, X is $CF_2$.

In one embodiment of the process, Y is O. In an alternative embodiment, Y is $CF_2$.

In one embodiment of the process Z is Cl or Br. In a further embodiment, Z is Cl. In an alternative embodiment, one R is represented by the structure (II), and one Z is H. In a further embodiment, one R is represented by the structure (II), one Z is H, and one Z is Cl.

In one embodiment of the process, $Rf^1$ is $CF_2$.

In one embodiment of the process, $Rf^2$ is $CF_2$.

In one embodiment of the process, $Rf^2$ is a bond (that is, p=0), and Y is $CF_2$.

In one embodiment, a=0.

In one embodiment, a=1, q=0, and n=0.

In one embodiment of the process, each R is H, Z is Cl, $R^2$ is methyl, X is O, Y is O, $Rf^1$ is $CF_2$, and $Rf^2$ is perfluoropropenyl, and q=1.

Suitable alkylene glycols include but are not limited to 1,2-ethanediol, 1,3-propanediol, 1,4-butanediol, and mixtures thereof. In one embodiment, the alkylene glycol is 1,3-propanediol.

Suitable catalysts include but are not limited to titanium (IV) butoxide, titanium (IV) isopropoxide, antimony trioxide, antimony triglycolate, sodium acetate, manganese acetate, and dibutyl tin oxide. The selection of catalysts is based on the degree of reactivity associated with the selected glycol. For example, it is known that 1,3-propanediol is considerably less reactive than is 1,2-ethanediol. Titanium butoxide and dibutyl tin oxide—both considered "hot" catalysts—have been found to be suitable for process when 1,3-propanediol is employed, but are considered over-active for the process when 1,2-ethanediol.

The reaction can be carried out in the melt. The thus resulting polymer can be separated by vacuum distillation to remove the excess of $C_2$-$C_4$ glycol.

In one embodiment the reaction mixture comprises more than one embodiment of the repeat units encompassed in structure (I).

In another embodiment, the reaction mixture further comprises an aromatic diester or aromatic diacid represented by the structure (VI)

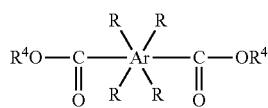

VI wherein Ar is an aromatic radical, $R^4$ is H or $C_1$-$C_{10}$ alkyl, and each R is independently H or $C_1$-$C_{10}$ alkyl. In a further embodiment, $R^4$ is H and each R is H. In an alternative embodiment, $R^4$ is methyl and each R is H. In one embodiment Ar is benzyl. In an alternative embodiment, Ar is naphthyl.

Suitable aromatic diesters of structure (VI) include but are not limited to dimethyl terephthalate, dimethyl isophthalate, 2,6-naphthalene dimethyldicarboxylate, methyl 4,4'-sulfonyl bisbenzoate, methyl 4-sulfophthalic ester, and methyl biphenyl-4,4'-dicarboxylate. In one embodiment, the aromatic diester is dimethyl terephthalate. In an alternative embodiment, the aromatic diester is dimethyl isophthalate. Suitable aromatic diacids of structure (VI) include but are not limited to isophthalic acid, terephthalic acid, 2,6-naphthalene dicarboxylic acid, 4,4'-sulfonyl bisbenzoic acid, 4-sulfophthalic acid and biphenyl-4,4'-dicarboxylic acid. In one embodiment, the aromatic diacid is terephthallic acid. In an alternative embodiment, the aromatic diacid is isophthallic acid.

Suitable fluorovinyl ether functionalized aromatic diesters can be prepared by forming a reaction mixture comprising a hydroxy aromatic diester in the presence of a solvent and a catalyst with a perfluoro vinyl compound represented by the structure (VII)

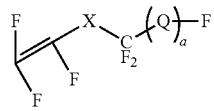

VII wherein X is O or $CF_2$, a=0 or 1; and, Q represents the structure (Ia)

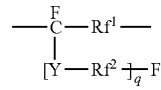

Ia wherein q=0-10;

Y is O or $CF_2$;

$Rf^1$ is $(CF_2)_n$, wherein n is 0-10;

$Rf^2$ is $(CF_2)_p$, wherein p is 0-10, with the proviso that when p is 0, Y is $CF_2$; at a temperature between about −70° C. and the reflux temperature of the reaction mixture.

Preferably the reaction is conducted using agitation at a temperature above room temperature but below the reflux temperature of the reaction mixture. The reaction mixture is cooled following reaction.

When a halogenated solvent is employed, the group indicated as "Z" in the resulting fluorovinyl ether aromatic diester represented by structure (III) is the corresponding halogen. Suitable halogenated solvents include but are not limited to tetrachloromethane, tetrabromomethane, hexachloroethane and hexabromoethane. If the solvent is non-halogenated Z is H. Suitable non-halogenated solvents include but are not limited to tetrahydrofuran (THF), dioxane, and dimethylformamide (DMF).

The reaction is catalyzed by a base. A variety of basic catalysts can be used, i.e., any catalyst that is capable of deprotonating phenol. That is, a suitable catalyst is any catalyst having a pKa greater than that of phenol (9.95, using water at 25° C. as reference). Suitable catalysts include, but are not limited to, sodium methoxide, calcium hydride, sodium metal, potassium methoxide, potassium t-butoxide, potassium carbonate or sodium carbonate. Preferred are potassium t-butoxide, potassium carbonate, or sodium carbonate.

Reaction can be terminated at any desirable point by the addition of acid (such as, but not limited to, 10% HCl). Alternatively, when using solid catalysts, such as the carbonate catalysts, the reaction mixture can be filtered to remove the catalyst, thereby terminating the reaction.

Suitable hydroxy aromatic diesters include, but are not limited to, 1,4-dimethyl-2-hydroxy terephthalate, 1,4-diethyl-2-5-dihydroxy terephthalate, 1,3-dimethyl 4-hydroxyisophthalate, 1,3-dimethyl-5-hydroxy isophthalate, 1,3-dimethyl 2-hydroxyisophthalate, 1,3-dimethyl 2,5-dihydroxyisophthalate, 1,3-dimethyl 2,4-dihydroxyisophthalate, dimethyl 3-hydroxyphthalate, dimethyl 4-hydroxyphthalate, dimethyl 3,4-dihydroxyphthalate, dimethyl 4,5-dihydroxyphthalate, dimethyl 3,6-dihydroxyphthalate, dimethyl 4,8-dihydroxynaphthalene-1,5-dicarboxylate, dimethyl 3,7-dihydroxynaphthalene-1,5-dicarboxylate, dimethyl 2,6-dihydroxynaphthalene-1,5-dicarboxylate, or mixtures thereof.

Suitable perfluorovinyl compounds include, but are not limited to, 1,1,1,2,2,3,3-heptafluoro-3-(1,1,1,2,3,3-hexafluoro-3-(1,2,2-trifluorovinyloxy)propan-2-yloxy)propane, heptafluoropropyltrifluorovinylether, perfluoropent-1-ene, perfluorohex-1-ene, perfluorohept-1-ene, perfluorooct-1-ene, perfluoronon-1-ene, perfluorodec-1-ene, and mixtures thereof.

To prepare a suitable fluorovinyl ether functionalized aromatic diester a suitable hydroxy aromatic diester and a suitable perfluovinyl compound are combined in the presence of a suitable solvent and a suitable catalyst until the reaction has achieved the desired degree of conversion. The reaction can be continued until no further product is produced over some preselected time scale. The required reaction time to achieve the desired degree of conversion depends upon the reaction temperature, the chemical reactivity of the specific reaction mixture components, and the degree of mixing applied to the reaction mixture. Progress of the reaction can be monitored using any one of a variety of established analytical methods, including, but not limited to, nuclear magnetic resonance spectroscopy, thin layer chromatography, and gas chromatography.

When the desired level of conversion has been achieved, the reaction mixture is quenched, as described supra. The thus quenched reaction mixture can be concentrated under vacuum, and rinsed with a solvent. Under some circumstances, a plurality of compounds encompassed by the structure (III) can be made in a single reaction mixture. In such cases, separation of the products thus produced can be effected by any method known to the skilled artisan such as, but not limited to, distillation or column chromatography.

If it is desired to employ the corresponding diacid as the monomer instead of the diester, the thus produced fluorovinyl ether functionalized aromatic diester can be contacted with an aqueous base, preferably a strong base such as KOH or NaOH, at a gentle reflux, followed by cooling to room temperature, followed by acidifying the mixture, preferably with a strong acid, such as HCl or $H_2SO_4$, until the pH is between 0 and 2. Preferably pH is 1. The acidification thus performed causes the precipitation of the fluorovinyl ether functionalized aromatic diacid. The thus precipitated diacid can then be isolated via filtration and recrystallization from suitable solvents (e.g., redissolved in a solvent such as ethyl acetate, and then recrystallized). The progress of the reaction can be followed by any convenient method, including but not limited to thin layer chromatography, gas chromatography and NMR. Once the fluorovinyl ether aromatic compound has been prepared, it is suitable for polymerization, among other potential uses.

The invention is further described but not limited by the following specific embodiments.

EXAMPLES

The chemicals and reagents were used as received in the Examples as follows:
From Sigma-Aldrich, Milwaukee, Wis.:
  dimethyl terephthalate
  terephthalic acid
  titanium(IV) isopropoxide
  titanium(IV) n-butoxide
  Tyzor® TPT tetra-n-propoxide
  potassium t-butoxide
  dimethyl 5-hydroxyisophthalate
  tetrahydrofuran
  dimethyl formamide (DMF)
  dichloromethane
  tetrachloromethane (carbon tetrachloride)
  tetrabromomethane (carbon tetrabromide)
  hexane
  acetic acid
  hydrochloric acid
  anhydrous sodium sulfate
  diethyl 2,5-dihydroxy terephthalate
  1,4-dimethyl-2-hydroxy terephthalate
  1,4-dimethyl-5-hydroxy terephthalate
From DuPont Tate & Lyle, Loudon, Tenn.:
  1,3-propane diol
From SynQuest Labs, Alachua, Fla.:
  1,1,1,2,2,3,3-heptafluoro-3-(1,1,1,2,3,3-hexafluoro-3-(1,2,2-trifluorovinyloxy)propan-2-yloxy)propane
  heptafluoropropyltrifluorovinylether
  perfluoroprop-1-ene
  5-(1,1,2-trifluoro-2-(perfluoropropoxy)ethoxy) isophthalic acid Preparation of dimethyl 2-(1,1,2-trifluoro-2-(1,1,2,3,3-hexafluoro-2-(perfluoropropoxy)propoxy)ethoxy)terephthalate;

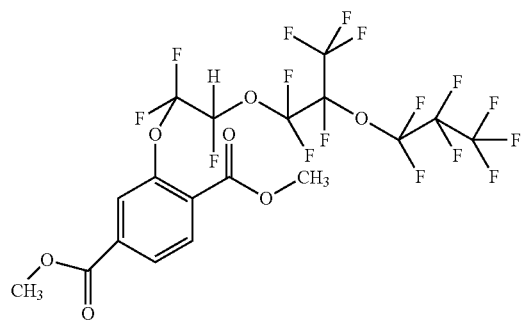

In a dry box, 1,4-dimethyl-2-hydroxy terephthalate (30.25 g, 0.144 mol) was added to an oven dried multiple neck 500 mL reaction flask equipped with a stirring bar and a pressure equaling (PE) addition funnel. Tetrahydrofuran (THF, 288 mL) was then added forming a mixture. The mixture was stirred until a homogeneous solution resulted. Potassium t-butoxide (4.435 g, 0.040 mol) was added, resulting in a heterogeneous mixture. Via the PE funnel, 1,1,1,2,2,3,3-heptafluoro-3-(1,1,1,2,3,3-hexafluoro-3-(1,2,2-trifluorovinyloxy)propan-2-yloxy)propane (155.52 g, 0.36 mol) was added resulting in a reaction mixture. The reaction mixture was allowed to stir at room temperature (approximately 25° C.) for ~40 hours. The reaction mixture was quenched by the addition of 5 mL of 10% HCl. A material was formed from the reaction mixture. The material in the reaction flask was concentrated at reduced pressure. The material was then dissolved in dichloromethane (~300 mL) and then washed with 10% HCl (2×75 mL) and then with water (~75 mL), yielding an organic and an aqueous phase. The separated organic phase was then dried over anhydrous sodium sulfate. The sodium sulfate was then filtered off and the resulting material concentrated at reduced pressure and then fractionally vacuum distilled. The fractions boiling between 134-136° C.

at 1.4-1.1 torr (84.55 g, 91.4% yield) and 136-138 at 1.1 torr (3.35 g) (combined yield: 95.04%) were collected. NMRs (nuclear magnetic resonance) of these samples were shown to be dimethyl 2-(1,1,2-trifluoro-2-(1,1,2,3,3,3-hexafluoro-2-(perfluoropropoxy)propoxy)ethoxy)terephthalate.

Preparation of dimethyl 5-(1,1,2-trifluoro-2-(1,1,2,3,3,3-hexafluoro-2-(perfluoropropoxy)propoxy)ethoxy)isophthalate;

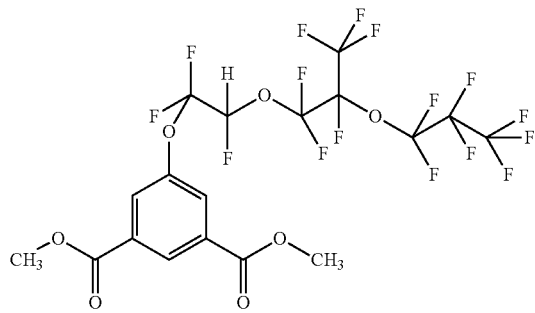

In a dry box, tetrahydrofuran (THF, 1000 mL) and dimethyl 5-hydroxyisophthalate (42.00 g, 0.20 mol) were added to an oven dry round bottom reaction flask equipped with a stirrer and an addition funnel; then potassium t-butoxide (6.16 g, 0.055 mol) was added. 1,1,1,2,2,3,3-Heptafluoro-3-(1,1,1,2,3,3-hexafluoro-3-(1,2,2-trifluorovinyloxy)propan-2-yloxy)propane (216 g, 0.50 mol) was then added via the addition funnel forming a reaction. The reaction was allowed to stir at room temperature. After 24 hours the reaction was terminated via the addition of 80 mL of 10% HCl. The reaction was concentrated at reduced pressure, diluted with dichloromethane, washed with 10% HCl (2×100 mL) and then with water (2×100 mL) forming an organic phase and a crude product. The organic phase was dried over anhydrous sodium sulfate and concentrated at reduced pressure. The crude product was purified by column chromatography to give 86.07 g (67.32%) yield of dimethyl 5-(1,1,2-trifluoro-2-(1,1,2,3,3,3-hexafluoro-2-(perfluoropropoxy)propoxy)ethoxy)isophthalate.

Preparation of Dimethyl 2-(2-chloro-1,1,2-trifluoro-2-(perfluoropropoxy)ethoxy)terephthalate

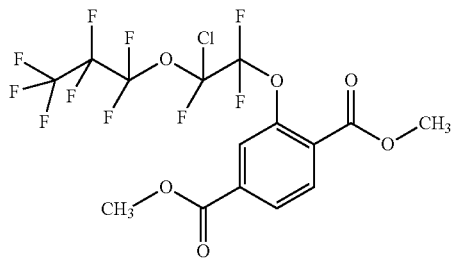

In a dry box, 1,4-dimethyl-2-hydroxy terephthalate (35.85 g, 0.185 mol) was added to an oven dried round bottom reaction flask equipped with a stirring bar and a pressure equaling (PE) addition funnel. Dimethyl formamide (DMF, 170.70.0 mL) and tetrachloromethane (~853 mL) were then added to the reaction flask and the reaction mixture was stirred until a homogeneous solution resulted. Potassium t-butoxide (0.154 g, 0.001375 mol) was added to the reaction flask, resulting in a heterogeneous mixture. Via the PE funnel, heptafluoropropyltrifluorovinylether (113.51 g, 0.426 mol) was added. The resulting reaction mixture was allowed to stir at room temperature (about 25° C.) for ~24 hours. The reaction was quenched by the addition for 50 mL of 10% HCl. The resulting material in the reaction flask was concentrated at reduced pressure. This material was then dissolved in dichloromethane and then washed with 10% HCl (2×) and then with water to form an organic phase and an aqueous phase. The separated organic phase was then dried over anhydrous sodium sulfate. The sodium sulfate was then filtered off and the filtrate concentrated at reduced pressure to form a crude material. This crude material was then purified by column chromatography to give the pure material, dimethyl 2-(2-chloro-1,1,2-trifluoro-2-(perfluoropropoxy)ethoxy)terephthalate, as an oil, 80.56 g (92.49% yield).

Preparation of Dimethyl 2-(2-bromo-1,1,2-trifluoro-2-(perfluoropropoxy)ethoxy)terephthalate

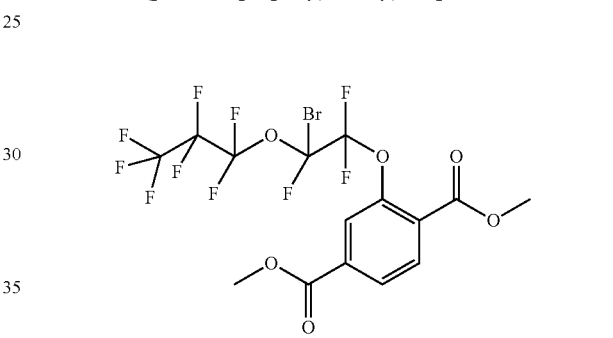

In a dry box, 1,4-dimethyl-2-hydroxy terephthalate (1.05 g, 0.005 mol) was added to an oven dried 100 mL reaction flask equipped with a stirring bar and a pressure equaling (PE) addition funnel. Dimethyl formamide (20.0 mL) and carbon tetrabromide (12.5 g) were then added to the reaction flask, and the reaction mixture was stirred until a homogeneous solution resulted. Potassium t-butoxide (0.154 g, 0.001375 mol) was added to the reaction flask, resulting in a heterogeneous mixture. Via the PE funnel, heptafluoropropyltrifluorovinylether (3.325 g, 0.0125 mol) was added. The reaction mixture was allowed to stir at room temperature (about 25° C.) for ~24 hours. The reaction was quenched by the addition for 2 mL of 10% HCl. The resulting material in the reaction flask was concentrated at reduced pressure. This material was then dissolved in dichloromethane (~150 mL) and then washed with 10% HCl (2×25 mL) and then with water (~25 mL) to form an organic phase and an aqueous phase. The separated organic phase was then dried over anhydrous sodium sulfate. The sodium sulfate was then filtered off and the filtrate concentrated at reduced pressure to form a crude material. NMR of this crude material only showed the desired material, dimethyl 2-(2-bromo-1,1,2-trifluoro-2-(perfluoropropoxy)ethoxy)terephthalate, and small amounts of dimethyl formamide and carbon tetrabromide present. This crude material was then purified by column chromatography to give the pure material, dimethyl 2-(2-bromo-1,1,2-trifluoro-2-(perfluoropropoxy)ethoxy)terephthalate, as a clear oil, 2.280 g (82.31% yield).

Example 1

Homo-Polyester of Dimethyl 2-(1,1,2-trifluoro-2-(1,1,2,3,3,3-hexafluoro-2-(perfluoropropoxy)propoxy)ethoxy)terephthalate and 1,3-propanediol Dimethyl 2-(1,1,2-trifluoro-2-(1,1,2,3,3,3-hexafluoro-2-(perfluoropropoxy)propoxy)ethoxy)terephthalate (64.2 g, 0.10 mol), 1,3-propanediol (19.00, 0.25 mol) and titanium n-butoxide (0.34 g, 0.001 mol) were charged into a oven dried three neck reaction flask equipped with a mechanical stirrer, thermocouple and a vigreux column, attached to a distillation head, with receiving flask, to form a reaction mixture. The resulting mixture was heated to 180° C., then to 225° C. over 50 minutes and then to 250° C. over 90 minutes. At this point the material was yellow in color. Vacuum was applied to the reaction, causing the temperature to fall to 214° C. Over the next 40 minutes the temperature recovered to 226° C. with a vacuum of 0.60 torr and attained 248° C. over the next 25 minutes with the vacuum holding at 0.7 torr, wherein lighter components (e.g., methanol, excess 1,3-propanediol) were distilled over to a distillation flask. A dark brown reaction mixture remained in the reaction flask. The dark brown reaction mixture containing viscous homopolymer was stirred at 248° C. for 35 minutes and then the reaction was terminated. The distillate in the distillation flask contained two phases, a top phase and a bottom phase, which were separated. NMR analyses of the top phase (15.51 g) showed it to be a mixture of 1,3-propanediol and methanol. The bottom phase (5.68 g) was a mixture of reaction materials as shown via NMR analyses.

Viscous homopolymer that remained in the reaction flask was dark brown in color. Nuclear magnetic resonance was used to determine its composition and it was identified as the homo-polyester of dimethyl 2-(1,1,2-trifluoro-2-(1,1,2,3,3,3-hexafluoro-2-(perfluoropropoxy)propoxy)ethoxy)terephthalate and 1,3-propanediol.

Example 2

Co-Polyester of Dimethyl 2-(1,1,2-trifluoro-2-(1,1,2,3,3,3-hexafluoro-2-(perfluoropropoxy)propoxy)ethoxy)terephthalate, dimethyl terephthalate and 1,3-propanediol Dimethyl 2-(1,1,2-trifluoro-2-(1,1,2,3,3,3-hexafluoro-2-(perfluoropropoxy)propoxy)ethoxy)terephthalate (31.1 g, 0.05 mol), dimethyl terephthalate (9.7 (0.05)1,3-propanediol (19.00, 0.25 mol) and titanium n-butoxide (0.34 g, 0.001 mol) were charged into a oven dried three neck reaction flask equipped with a mechanical stirrer, thermocouple and a vigreux column, attached to a distillation head, with receiving flask, to form a reaction mixture. The reaction mixture was heated to 200° C., then held at that temperature for 60 minutes, then heated to 225° C. over 30 minutes, then held at that temperature for 20 minutes, and then to 250° C. over 40 minutes, then held at that temperature for an hour, wherein lighter components (e.g., methanol, excess 1,3-propanediol) were distilled over to a distillation flask. At this point the mixture that remained in the reaction flask was yellow in color. Vacuum was applied to the reaction flask. The reaction mixture containing viscous copolymer in the reaction flask was heated at ~250° C. and a vacuum of 0.7-0.85 torr over 2 hours.

The distillate in the distillation flask contained two phases, a top phase and a bottom phase, which were separated. NMR analyses of the top phase (18.02 g) showed it to be a mixture of 1,3-propanediol and methanol. The bottom phase (0.88 g) was a mixture of reaction materials as shown via NMR analyses. The viscous homopolymer remaining in the reaction flask was dark brown in color, and was elastomeric. Nuclear magnetic resonance was used to determine its composition and it was identified as a co-polyester of dimethyl 2-(1,1,2-trifluoro-2-(1,1,2,3,3,3-hexafluoro-2-(perfluoropropoxy)propoxy)ethoxy)terephthalate, dimethyl terephthalate and 1,3-propanediol.

Example 3

Copolymerization of 1,3-propanediol with dimethyl 2-(1,1,2-trifluoro-2-(perfluoropropoxy)ethoxy) terephthalate, and dimethyl terephthalate Dimethylterephthalate (DMT, 130 g, 0.66 mol), dimethyl 2-(1,1,2-trifluoro-2-(perfluoropropoxy)ethoxy)terephthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached. The reactants were stirred at a speed of 50 rounds per minute (rpm), the reaction mixture was kept under nitrogen$_{(g)}$ ($N_2$) purge atmosphere and the condenser was kept at 23° C. The reaction mixture was degassed three times by evacuating down to 100 Torr and refilling back with $N_2$ gas. Tyzor®TPT catalyst [50 ppm Ti to theoretical polymer yield, $\delta_{TYZOR}$=0.96 g/mL] was added to the reaction flask after the first evacuation. The reaction flask was immersed into a preheated metal bath set at 160° C. The solids in the reaction flask were allowed to completely melt at 160° C. for 20 minutes, after which the stirring speed was slowly increased to 180 rpm. The reaction temperature was increased to 210° C. and maintained for 90 minutes to distill off most of the formed methanol into a distillation flask. The reaction temperature was increased to 250° C. after which the nitrogen purge was closed and a vacuum ramp started on the reaction flask. After about 60 minutes the vacuum reached a value of 50-60 mTorr. As the vacuum stabilized the stirring speed was increased to 225 rpm and the reaction conditions were held for a maximum of 3-4 hours. The torque of the stirrer was monitored (readings at 180 rpm) and the reaction was stopped when a value of ~100N/cm² was reached. The polymerization was stopped by removing the heat source. The over-head stirrer was stopped and elevated from the floor of the reaction vessel before the vacuum was turned off and the system purged with $N_2$ gas. The formed product was allowed to cool to ambient temperature, the reaction flask was detached from the distillation column and flask, and the product recovered after carefully breaking the reaction flask glass with a hammer. The isolated product containing a copolymer of 1,3-propanediol, dimethyl 2-(1,1,2-trifluoro-2-(perfluoropropoxy)ethoxy) terephthalate, and dimethyl terephthalate was cryo-ground (using liquid nitrogen) to produce an off-white powder using a Wiley mill. Overall yield ~80-90%. $^1$H-NMR (CDCl$_3$/TFA-d, 700 MHz): δ 8.25-7.90 (ArH—, m, backbone), 7.65 (ArH, s, cyclic dimer), 6.17 (—CF$_2$—CFH—O—, d, side chain), 4.75-4.45 (COO—CH$_2$—, m, backbone), 3.97 (HO—CH$_2$—R, t-broad, end group), 3.82 (—CH$_2$—O—CH$_2$—, t, backbone DPG), 2.45-2.05 (—CH$_2$—, m, backbone). The $^{19}$F-NMR scan is shown in FIG. 1.

Example 4

Copolymerization of 1,3-propanediol with dimethyl 5-(1,1,2-trifluoro-2-(perfluoropropoxy)ethoxy) isophthalate, and dimethyl terephthalate Dimethylterephthalate (DMT, 130 g, 0.66 mol), dimethyl 5-(1,1,2-trifluoro-2-(perfluoropropoxy)ethoxy) isophthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached. The reactants were stirred at a speed of 50 rounds per minute (rpm), the reaction mixture was kept under nitrogen$_{(g)}$ (N$_2$) purge atmosphere, and the condenser was kept at 23° C. The reaction mixture was degassed three times by evacuating down to 100 Torr and refilling back with N$_2$ gas. Tyzor®TPT catalyst [50 ppm Ti to theoretical polymer yield, $\delta_{TYZOR}$=0.96 g/mL] was added to the reaction flask after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature of the reaction mixture was increased to 210° C. and maintained for 90 minutes to distill off most of the formed methanol into a distillation flask. The temperature of the reaction mixture was increased to 250° C. after which the nitrogen purge was closed and a vacuum ramp started. After about 60 minutes, the vacuum reached a value of 50-60 mTorr. As the vacuum stabilized the stirring speed was increased to 225 rpm and the reaction conditions were held for a maximum of 3-4 hours. The torque of the stirrer was monitored (readings at 180 rpm) and the reaction was stopped when a value of ~100N/cm$^2$ was reached. The polymerization was stopped by removing the heat source. The over-head stirrer was stopped and elevated from the floor of the reaction vessel before the vacuum was turned off and the system purged with N$_2$ gas. The formed product was allowed to cool to ambient temperature, the reaction flask was detached from the distillation column and flask, and the product recovered after carefully breaking the reaction flask glass with a hammer. The isolated product containing a copolymer of 1,3-propanediol with dimethyl 5-(1,1,2-trifluoro-2-(perfluoropropoxy)ethoxy) isophthalate, and dimethyl terephthalate was cryo-ground (using liquid nitrogen) to produce an off-white powder using a Wiley mill. Overall yield ~80-90%. $^1$H-NMR (CDCl$_3$/TFA-d, 700 MHz): δ 8.60 (ArH, s, backbone), 8.25-7.90 (ArH—, m, backbone), 7.65 (ArH, s, cyclic dimer), 6.10 (—CF$_2$—CFH—O—, d, side chain), 4.75-4.45 (COO—CH$_2$—, m, backbone), 3.95 (HO—CH$_2$—R, t, end group), 3.82 (—CH$_2$—O—CH$_2$—, t, backbone DPG), 2.45-2.05 (—CH$_2$—, m, backbone).

Example 5

Copolymerization of 1,3-propanediol with dimethyl 2-(1,1,2-trifluoro-2-(1,1,2,3,3,3-hexafluoro-2-perfluoropropoxy)propoxy)ethoxy) terephthalate, and dimethyl terephthalate Dimethylterephthalate (DMT, 130 g, 0.66 mol), dimethyl 2-(1,1,2-trifluoro-2-(1,1,2,3,3,3-hexafluoro-2-perfluoropropoxy)propoxy)ethoxy) terephthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached. The reactants were stirred at a speed of 50 rounds per minute (rpm), the reaction mass was kept under nitrogen$_{(g)}$ (N$_2$) purge atmosphere, and the condenser was kept at 23° C. The reaction mixture was degassed three times by evacuating down to 100 Torr and refilling back with N$_2$ gas. Tyzor®TPT catalyst [50 ppm Ti to theoretical polymer yield, $\delta_{TYZOR}$=0.96 g/mL] was added to the reaction flask after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature of the reaction mixture was increased to 210° C. and maintained for 90 minutes to distill off most of the formed methanol into a distillation flask. The temperature of the reaction mixture was increased to 250° C. after which the nitrogen purge was closed and a vacuum ramp started. After about 60 minutes the vacuum reached a value of 50-60 mTorr. As the vacuum stabilized the stirring speed was increased to 225 rpm and the reaction conditions were held for a maximum of 3-4 hours. The torque of the stirrer was monitored (readings at 180 rpm) and the reaction was typically stopped when a value of ~100N/cm$^2$ was reached. The polymerization was stopped by removing the heat source. The over-head stirrer was stopped and elevated from the floor of the reaction vessel before the vacuum was turned off and the system purged with N$_2$ gas. The formed product was allowed to cool to ambient temperature and the reaction vessel was detached from the distillation column and flask, and the product recovered after carefully breaking the reaction flask glass with a hammer. The isolated polymer containing a Copolymer of 1,3-propanediol with dimethyl 2-(1,1,2-trifluoro-2-(1,1,2,3,3,3-hexafluoro-2-perfluoropropoxy)propoxy)ethoxy) terephthalate, and dimethyl terephthalate was cryo-ground (using liquid nitrogen) to produce an off-white powder using a Wiley mill. Overall yield ~80-90%. $^1$H-NMR (CDCl$_3$/TFA-d, 700 MHz): δ 8.25-7.90 (ArH—, m, backbone), 7.65 (ArH, s, cyclic dimer), 6.18 (—CF$_2$—CFH—O—, d, side chain), 4.75-4.45 (COO—CH$_2$—, m, backbone), 3.97 (HO—CH$_2$—R, t-broad, end group), 3.82 (—CH$_2$—O—CH$_2$—, t, backbone DPG), 2.45-2.05 (—CH$_2$—, m, backbone).

Example 6

Copolymerization of 1,3-propanediol with dimethyl 5-(1,1,2-trifluoro-2-(1,1,2,3,3,3-hexafluoro-2-perfluoropropoxy)propoxy)ethoxy)isophthalate, and dimethyl terephthalate Dimethylterephthalate (DMT, 130 g, 0.66 mol), dimethyl 5-(1,1,2-trifluoro-2-(1,1,2,3,3,3-hexafluoro-2-perfluoropropoxy)propoxy)ethoxy) isophthalate (weight percent relative DMT), and 1,3-propanediol (PDO, 90.4 g, 1.19 mol, 1.8 eq to DMT) were charged to a pre-dried 500 mL three necked round bottom reaction flask. An overhead stirrer and a distillation condenser were attached. The reactants were stirred at a speed of 50 rounds per minute (rpm), the reaction mixture was kept under nitrogen$_{(g)}$ (N$_2$) purge atmosphere, and the condenser was kept at 23° C. The reaction mixture was degassed three times by evacuating down to 100 Torr and refilling back with N$_2$ gas. Tyzor®TPT catalyst [50 ppm Ti to theoretical polymer yield, $\delta_{TYZOR}$=0.96 g/mL] was added to the reaction flask after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature of the reaction mixture was increased to 210° C. and maintained for 90 minutes to distill off most of the formed methanol into a distillation flask. The temperature of the reaction mixture was increased to 250° C. after which the nitrogen purge was closed and a vacuum ramp started. After about 60 minutes the vacuum reached a value of 50-60 mTorr. As the vacuum stabilized the stirring speed was increased to 225 rpm and the reaction conditions held for a maximum of 3-4 hours. The torque of the stirrer was monitored (readings at 180 rpm) and the reaction was stopped when a value of ~100N/cm$^2$ was reached. The polymerization was stopped by removing the heat source. The over head stirrer was stopped and elevated from the floor of the reaction flask before the vacuum was turned off and the system purged with $N_2$ gas. The formed product was allowed to cool to ambient temperature, the reaction vessel was removed, and the product recovered after carefully breaking the glass with a hammer. The isolated product containing a copolymer of 1,3-propanediol with dimethyl 5-(1,1,2-trifluoro-2-(1,1,2,3,3,3-hexafluoro-2-perfluoropropoxy)propoxy)ethoxy) isophthalate, and dimethyl terephthalate was cryo-ground (using liquid nitrogen) to produce an off-white powder using a Wiley mill. Overall yield ~80-90%. $^1$H-NMR ($CDCl_3$/TFA-d, 700 MHz): δ 8.60 (ArH, s, backbone), 8.25-7.90 (ArH—, m, backbone), 7.65 (ArH, s, cyclic dimer), 6.10 (—$CF_2$—CFH—O—, d, side chain), 4.75-4.45 (COO—$CH_2$—, m, backbone), 3.95 (HO—$CH_2$—R, t, end group), 3.82 (—$CH_2$—O—$CH_2$—, t, backbone DPG), 2.45-2.05 (—$CH_2$—, m, backbone).

Example 7

Copolymerization of 1,3-propanediol with 5-(1,1,2-trifluoro-2-(perfluoropropoxy)ethoxy)isophthalic acid, and terephthalic acid In a 500 mL three necked round bottom reaction flask 1,3-propanediol (PDO) (74.65 g, 0.98 mol), terephthalic acid (TPA) (80 g, 0.48 mmol), 5-(1,1,2-trifluoro-2-(perfluoropropoxy)ethoxy) isophthalic acid (4 g, 0.0089 mol), and TYZOR® catalyst (21 mg, 21 µL, 25 ppm to 140.52 g theoretical product yield, $δ_{TYZOR®}$=0.96 g/mL) were charged to form a reaction mixture, and the reaction flask was then connected to a nitrogen/vacuum inlet/outlet and a distillation condenser. The reaction flask was evacuated three times (backfilling with nitrogen), left under a static nitrogen blanket, and immersed into a metal bath set at T=160° C., stirring at 50 rounds per minute (rpm). The reaction mixture was allowed to equilibrate at 160° C. for 10 minutes with an increased stirring speed of 180 rpm and then gradually heated to the final set temperature at T=240° C. The reaction mixture was kept at this temperature for 4 hours (max), or the reaction was stopped when the water evolution had completely leveled off or the reaction mixture melt became homogeneous. When the reaction was completed the metal bath was removed, the stirrer turned off, and the product formed from the reaction mixture allowed to cool to ambient temperature under a low stream of nitrogen and left until the following morning. Under nitrogen purge the traps were emptied and put together again. TYZOR® catalyst (31 mg, 32 µL, 50 ppm to theoretical polymer yield=103.2 g) was added to the reaction flask, after which the system was degassed one time by pumping to 100 Torr. The reaction flask was back-filled with nitrogen and immersed into a metal bath set at T=160° C. The reaction system was allowed to equilibrate for 10 minutes and the temperature increased to T=250° C. When the intermediate formed in the reaction flask started to melt the stirring speed was increased to 180 rpm. The nitrogen purge was closed and a vacuum ramp started. After about 60 minutes the vacuum reached a value of 50-60 mTorr. The reaction conditions were held for a maximum of 3-4 hours or until the torque of the stirrer was around 100N/cm. The polymerization was stopped by removing the heat source, the reaction flask was detached from the distillation column and flask, and the product was recovered by carefully breaking the reaction flask glass with a hammer. The isolated product contained a copolymer of 1,3-propanediol with 5-(1,1,2-trifluoro-2-(perfluoropropoxy)ethoxy)isophthalic acid, and terephthalic acid. Overall yield ~80-90%. $^1$H-NMR ($CDCl_3$/TFA-d, 700 MHz): δ 8.62 (ArH—, s, backbone), 8.25-8.05 (ArH—, m, backbone), 7.65 (ArH, s, cyclic dimer), 6.15 (—$CF_2$—CFH—O—, d, side chain), 4.75-4.55 (COO—$CH_2$—, m, backbone), 3.97 (HO—$CH_2$—R, t-broad, end group), 3.82 (—$CH_2$—O—$CH_2$—, t, backbone DPG), 2.45-2.30 (—$CH_2$—, m, backbone). An alternative method to produce the desired product is to apply the vacuum ramp subsequent to the water condensation step. In this case the temperature would be increased to 250° C. The vacuum ramp would be applied and the excess 1,3-propanediol would be driven off to complete the polymerization. The torque of the stirrer would be monitored in the same manner as described above, and the reaction stopped when the torque had increased to the desired level.

Example 8

Copolymerization of 1,3-propanediol dimethyl-2-(2-chloro-1,1,2-trifluoro-2-(perfluoropropoxy)ethoxy) terephtalate, and dimethyl terephthalate

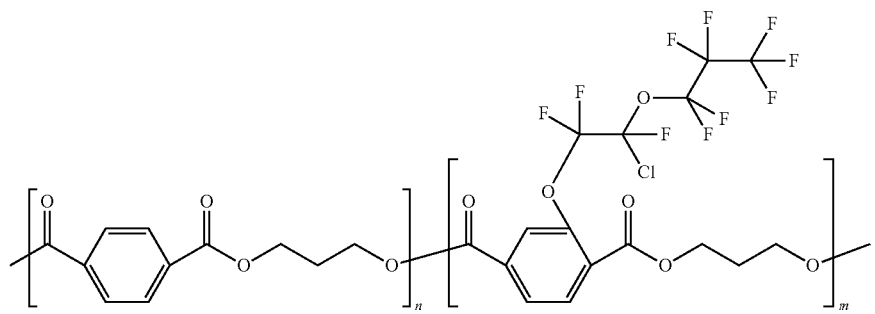

Dimethylterephthalate (DMT, 130 g, 0.66 mol), dimethyl-2-(2-chloro-1,1,2-trifluoro-2-(perfluoropropoxy)ethoxy) terephthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached to the reaction flask. The reactants were stirred at a speed of 50 rounds per minute (rpm) to form a reaction mixture, which was kept under nitrogen$_{(g)}$ ($N_2$) purge atmosphere. The condenser was kept at 23° C. The contents of the reaction flask were degassed three times by evacuating down to 100 Torr and refilling back with $N_2$ gas. Tyzor®TPT catalyst [50 ppm Ti to theoretical polymer yield, $δ_{TYZOR}$=0.96 g/mL] was added to the reaction flask after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature was increased to 210° C. and maintained at that temperature for 90 minutes to distill off most of the formed methanol into a distillation flask. The temperature of the metal bath into which the reaction flask was immersed was increased to 250° C. after which the nitrogen purge was closed and a vacuum ramp started; after about 60 minutes the vacuum applied to the reaction flask reached a value of 50-60 mTorr. As the vacuum stabilized the stirring speed was increased to 225 rpm and the reaction held for a maximum of 3-4 hours. The torque of the stirrer was monitored (readings at 180 rpm) and the reaction was stopped when a value of ~100N/cm² was reached. The polymerization was stopped by removing the heat source from the reaction flask. The over head stirrer was stopped and elevated from the floor of the reaction flask before the vacuum was turned off and the system purged with $N_2$ gas. The formed product in the reaction flask was allowed to cool to ambient temperature (about 25° C.) and the reaction flask was removed and the product recovered after carefully breaking the glass with a hammer. The isolated polymer was cryo-ground (using liquid nitrogen) to an off-white powder containing the desired product, the co-polymer of 1,3-propanediol dimethyl-2-(2-chloro-1,1,2-trifluoro-2-(perfluoropropoxy)ethoxy) terephtalate, and dimethyl terephthalate, using a Wiley mill. Overall product yield was ~80-90%. ¹H-NMR (CDCl₃/TFA-d, 700 MHz): δ 8.25-7.90 (ArH—, m, backbone), 7.65 (ArH, s, cyclic dimer), 4.75-4.45 (COO—CH₂—, m, backbone), 3.97 (HO—CH₂—R, t-broad, end group), 3.82 (—CH₂—O—CH₂—, t, backbone DPG), 2.45-2.05 (—CH₂—, m, backbone).

Example 9

Copolymerization of 1,3-propanediol dimethyl-2-(2-bromo-1,1,2-trifluoro-2-(perfluoropropoxy)ethoxy) terephthalate, and dimethyl terephthalate

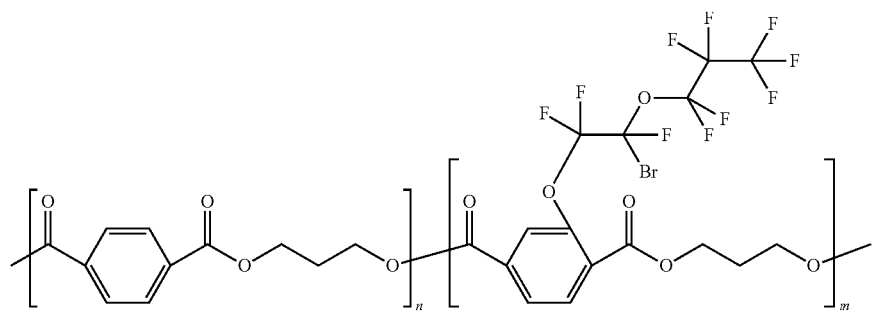

Dimethylterephthalate (DMT, 130 g, 0.66 mol), dimethyl-2-(2-bromo-1,1,2-trifluoro-2-(perfluoropropoxy)ethoxy) terephthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached to the reaction flask. The reactants were stirred at a speed of 50 rounds per minute (rpm) and the resulting reaction mixture was kept under nitrogen$_{(g)}$ ($N_2$) purge atmosphere. The condenser was kept at 23° C. The contents of the reaction flask were degassed three times by evacuating down to 100 Torr and refilling back with $N_2$ gas. Tyzor®TPT catalyst [50 ppm Ti to theoretical polymer yield, $\delta_{TYZOR}$=0.96 g/mL] was added to the reaction flask after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature was increased to 210° C. and maintained at that temperature for 90 minutes to distill off most of the formed methanol into a distillation flask. The temperature of the metal bath into which the reaction flask was immersed was increased to 250° C. after which the nitrogen purge was closed and a vacuum ramp started. After about 60 minutes the vacuum applied to the reaction flask reached a value of 50-60 mTorr. As the vacuum stabilized the stirring speed was increased to 225 rpm and the reaction held for a maximum of 3-4 hours. The torque of the stirrer was monitored (readings at 180 rpm) and the reaction was stopped when a value of ~100N/cm² was reached. The polymerization was stopped by removing the heat source from the reaction flask. The over head stirrer was stopped and elevated from the floor of the reaction flask before the vacuum was turned off and the system purged with $N_2$ gas. The formed product in the reaction flask was allowed to cool to ambient temperature and the reaction flask was removed and the product recovered after carefully breaking the glass with a hammer. The isolated polymer was cryo-ground (using liquid nitrogen) to an off-white powder containing the desired product, a copolymer of 1,3-propanediol dimethyl-2-(2-bromo-1,1,2-trifluoro-2-(perfluoropropoxy) ethoxy) terephthalate, and dimethyl terephthalate, using a Wiley mill. Overall yield ~80-90%. ¹H-NMR* (CDCl₃/TFA-d, 700 MHz): δ 8.25-7.90 (ArH—, m, backbone), 7.65 (ArH, s, cyclic dimer), 4.75-4.45 (COO—CH₂—, m, backbone), 3.97 (HO—CH₂—R, t-broad, end group), 3.82 (—CH₂—O—CH₂—, t, backbone DPG), 2.45-2.05 (—CH₂—, m, backbone).

Example 10

Copolymerization of ethylene glycol with dimethyl 5-(1,1,2-trifluoro-2-(1,1,2,3,3,3-hexafluoro-2-perfluoropropoxy)propoxy)ethoxy) isophthalate, and dimethylterephtalate 85.36 g (0.44 mol) of dimethyl 5-(1,1,2-trifluoro-2-(1,1,2,3,3,3-hexafluoro-2-perfluoropropoxy)propoxy)ethoxy) isophthalate (weight percent relative DMT), and ethylene glycol (81.93 g, 1.32 mol) were charged to a pre-dried 500 mL three-necked round bottom flask. An overhead stirrer and a distillation condenser were attached. The reactants were stirred at a speed of 50 rpm, the reaction mass was kept under nitrogen purge, and, the condenser was kept at 23° C. The contents were degassed three times by evacuating down to 100 Torr and refilling back with N2 gas. Tyzor®TPT catalyst was added [200 ppm Ti to 92.8 g theoretical polymer, $\delta$TYZOR=0.96 g/mL] after the first evacuation. The flask was immersed into a preheated metal bath set at 160° C. The solids were allowed to completely melt at 160° C. for 10 minutes and the stirrer speed was slowly increased to 180 rpm. The temperature was increased to 210° C. and maintained for 90 minutes to distill off the formed methanol. The temperature was increased to 280° C. after which the nitrogen purge was closed and a vacuum ramp started, after about 60 minutes the vacuum reached a value of 50-60 mTorr. As the vacuum stabilized the stirring speed was increased to 225 rpm and the reaction held for 3-4 hours (follow the torque, readings at 180 rpm).

The polymerization was stopped by removing the heat source. The over head stirrer was stopped and elevated from the floor of the reaction vessel. The formed product was allowed to cool to ambient temperature and the vacuum turned off and the system purged with N2 gas. The reaction vessel was removed and the product recovered after carefully breaking the glass with a hammer. The isolated polymer was cryo-ground (using liquid nitrogen) to an off-white powder using a Wiley mill. Overall yield ~80-90%. 1H-NMR (CDCl3/TFA-d, 500 MHz): $\delta$ 8.60 (ArH, s, backbone), 8.25-7.95 (ArH—, m, backbone), 6.10 (—CF2-CFH—O—, d, side chain), 4.80-4.45 (COO—CH$_2$—, m, backbone).

Example 11

Copolymerization of 1,4-butanediol with dimethyl 5-(1,1,2-trifluoro-2-(1,1,2,3,3,3-hexafluoro-2-perfluoropropoxy)propoxy)ethoxy) isophthalate, and dimethylterephtalate Dimethylterephtalate (DMT, 85.3 g, 0.44 mol), dimethyl 5-(1,1,2-trifluoro-2-(1,1,2,3,3,3-hexafluoro-2-perfluoropropoxy)propoxy)ethoxy) isophthalate (weight percent relative DMT), and 1,4-butanediol (79.3 g, 0.88 mol) were charged to a pre-dried 500 mL three necked round bottom flask. An overhead stirrer and a distillation condenser were attached. The reactants were stirred at a speed of 50 rpm, the reaction mass was kept under a nitrogen purge, and the condenser was kept at 23° C. The contents were degassed three times by evacuating down to 100 Torr and refilling back with N$_2$ gas. Tyzor®TPT catalyst [200 ppm Ti to theoretical polymer yield, $\delta$TYZOR=0.96 g/mL] was added after the first evacuation. The flask was immersed into a preheated metal bath set at 160° C. The solids were allowed to completely melt at 160° C. for 10 minutes and the stirrer speed was slowly increased to 180 rpm. The temperature was increased to 210° C. and maintained for 90 minutes to distill off the formed methanol. The temperature was increased to 250° C. after which the nitrogen purge was closed and a vacuum ramp started, after about 60 minutes the vacuum reached a value of 50-60 mTorr. As the vacuum stabilized the stirring speed was increased to 225 rpm and the reaction held for 3-4 hours. The torque was monitored (readings at 180 rpm) and the reaction was typically stopped when a value of ~100N/cm2 was reached. The polymerization was stopped by removing the heat source. The over head stirrer was turned off and elevated from the floor of the reaction vessel before the system was purged with N2 gas. The formed product was allowed to cool to ambient temperature and the reaction vessel was removed and the product recovered after carefully breaking the glass with a hammer. The isolated polymer was cryo-ground (using liquid nitrogen) to an off-white powder using a Wiley mill. Yield ~80-90%. 1H-NMR (CDCl3/TFA-d, 500 MHz): $\delta$ $\delta$ 8.60 (ArH, s, backbone), 8.25-7.95 (ArH—, m, backbone), 6.10 (—CF2-CFH—O—, d, side chain), 4.70-4.30 (COO—CH$_2$—, m, backbone), 2.20-1.80 (—CH2-, m, backbone). For 1H-NMR and 19F-NMR spectrums see below.

Example 12

Homopolymerization of dimethyl 5-(1,1,2-trifluoro-2-(perfluoropropoxy)ethoxy) isophtalate and 1,3-propanediol Dimethyl 5-(1,1,2-trifluoro-2-(perfluoropropoxy)ethoxy) isophtalate (100 g, 0.21 mol) and 1,3-propanediol (28.8 g, 0.38 mol) were charged to a pre-dried 500 mL three necked round bottom flask. An overhead stirrer and a distillation condenser were attached. The reactants were stirred at a speed of 50 rounds per minute (rpm) and the reaction mass was kept under nitrogen$_{(g)}$ (N$_2$) purge atmosphere, the condenser was kept at 23° C. The contents were degassed three times by evacuating down to 100 Torr and refilling back with N$_2$ gas. Tyzor®TPT catalyst [30 mg or 32 $\mu$L, 50 ppm Ti to 102 g theoretical polymer yield, $\delta_{TYZOR}$=0.96 g/mL] was added after the first evacuation. The flask was immersed into a preheated metal bath set at 210° C. and held for 120 minutes to distill off most of the formed methanol, stirring at 180 rpm. The nitrogen purge was stopped and a vacuum ramp started and after about 60 minutes the vacuum reached a value of 50-60 mTorr. The reaction was held for a maximum of 3-4 hours with stirring at 180/225 rpm, measure torque every 15/30 minutes (readings at 180 rpm). The polymerization was stopped by removing the heat source. The over head stirrer was stopped and elevated from the floor of the reaction vessel before the vacuum was turned off and the system purged with N$_2$ gas. The formed product was allowed to cool to ambient temperature and the reaction vessel was removed and the product recovered after carefully breaking the glass with a hammer. Yield ~88%. $^1$H-NMR (CDCl$_3$) $\delta$: 8.60 (ArH, s, 1H), 8.00 (ArH—, s, 2H), 7.70 (ArH, s, 4H), 6.15 (—CF$_2$—CFH—O—, d, 1H), 4.70-4.50 (COO—CH$_2$—, m, 4H), 3.95 (—CH$_2$—OH, t, 2H), 3.85 (—CH$_2$—O—CH$_2$—, t, 4H), 2.45-2.30 (—CH$_2$—, m, 2H), 2.10 (—CH$_2$—CH$_2$—O—CH$_2$—CH$_2$—, m, 4H).

Example 13

Homopolymerization of dimethyl 5-(1,1,2-trifluoro-2-(1,1,2,3,3,3-hexafluoro-2-perfluoropropoxy)propoxy)ethoxy) isophthalate with 1,3-propanediol Dimethyl 5-(1,1,2-trifluoro-2-(1,1,2,3,3,3-hexafluoro-2-perfluoropropoxy)propoxy)ethoxy) isophthalate (100 g, 0.156 mol) and 1,3-propanediol (21.3 g, 0.28 mol) were charged to a pre-dried 500 mL three necked round bottom flask. An overhead stirrer and a distillation condenser were attached. The reactants were stirred at a speed of 50 rounds per minute (rpm) and the reaction mass was kept under nitrogen$_{(g)}$ (N$_2$) purge atmosphere, the condenser was kept at 23° C. The contents were degassed three times by evacuating down to 100 Torr and refilling back with N$_2$ gas. Tyzor®TPT catalyst [30 mg or 32 $\mu$L, 50 ppm Ti to 102 g theoretical polymer yield, $\delta_{TYZOR}$=0.96 g/mL] was added after the first evacuation. The flask was immersed into a preheated metal bath set at 210° C. and held for 120 minutes to distill off most of the formed methanol, stirring at 180 rpm. The nitrogen purge was stopped and a vacuum ramp started and after about 60 minutes the vacuum reached a value of 50-60 mTorr. The reaction was held for a maximum of 3-4 hours with stirring at 180/225 rpm, measure torque every 15/30 minutes (readings at 180 rpm). The polymerization was stopped by removing the heat source. The over head stirrer was stopped and elevated from the floor of the reaction vessel before the vacuum was turned off and the system purged with $N_2$ gas. The formed product was allowed to cool to ambient temperature and the reaction vessel was removed and the product recovered after carefully breaking the glass with a hammer. Yield ~88%. $^1$H-NMR (CDCl$_3$) δ: 8.60 (ArH, s, 1H), 8.00 (Ar H—, s, 2H), 7.70 (ArH, s, 4H), 6.15 (—CF$_2$—CFH—O—, d, 1H), 4.70-4.50 (COO—CH$_2$—, m, 4H), 3.95 (—CH$_2$—OH, t, 2H), 3.85 (—CH$_2$—O—CH$_2$—, t, 4H), 2.45-2.30 (—CH$_2$—, m, 2H), 2.10 (—CH$_2$—CH$_2$—O—CH$_2$—CH$_2$—, m, 4H).

What is claimed is:

1. A polymer comprising a fluorovinyl ether functionalized aromatic repeat unit represented by the structure (I)

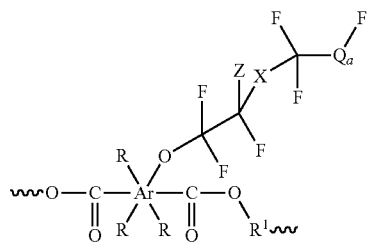

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

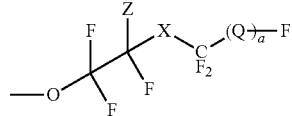

with the proviso that only one R can be OH or the radical represented by the structure (II);
R1 is a C2-C4 alkylene radical which can be branched or unbranched,
X is O or $CF_2$;
Z is H, Cl, or Br;
a=0 or 1;
and,
Q represents the structure (Ia)

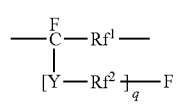

wherein q=0 - 10;
Y is O or $CF_2$;
$Rf^1$ is $(CF_2)_n$, wherein n is 0-10;

and,
R $(CF_2)_p$, wherein p is 0-10, with the proviso that when p is 0, Y is $CF_2$.

2. The polymer of claim 1 wherein each R is H.
3. The polymer of claim 1 wherein one R is a radical represented by the structure (II) and the remaining two Rs are each H.
4. The polymer of claim 1 wherein $R^1$ is an ethylene radical.
5. The polymer of claim 1 wherein $R^1$ is a trimethylene radical, which can be branched.
6. The polymer of claim 1 wherein $R^1$ is a tetramethylene radical, which can be branched.
7. The polymer of claim 1 wherein X is O.
8. The polymer of claim 1 wherein X is $CF_2$.
9. The polymer of claim 1 wherein Y is O.
10. The polymer of claim 1 wherein Y is $CF_2$.
11. The polymer of claim 1 wherein Z is Cl.
12. The polymer of claim 1 wherein one R is represented by the structure (II), one Z is H, and one Z is Cl.
13. The polymer of claim 1 wherein $Rf^1$ is $CF_2$.
14. The polymer of claim 1 wherein $Rf^2$ is $CF_2$.
15. The polymer of claim 1 wherein p=0, and Y is $CF_2$.
16. The polymer of claim 1 wherein a=0.
17. The polymer of claim 1 wherein a=1, q=0, and n=0.
18. The polymer of claim 1 wherein a=1, each R is H, Z is Cl, $R^1$ is methoxy, X is O, Y is O, $Rf^1$ is $CF_2$, and R is perfluoropropenyl, and q=1.
19. The polymer of claim 1 wherein the polymer of the invention is a homopolymer.
20. The polymer of claim 1 wherein the repeat unit is represented by the structure (IVa)

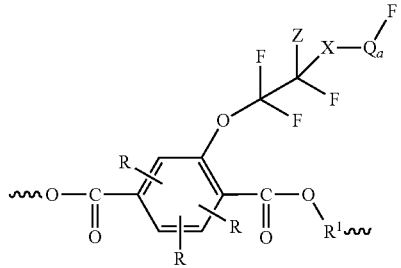

wherein R, $R^1$, Z, X, Q, and a are as stated supra.

21. The polymer of claim 1 wherein the repeat unit is represented by the structure (IVb)

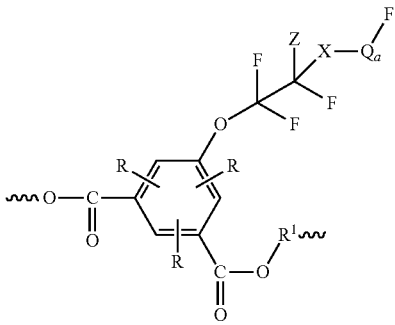

wherein R, $R^1$, Z, X, Q, and a are as stated supra.

22. The polymer of claim 1 further comprising arylate repeat units represented by the structure (V),

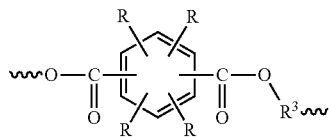

wherein each R is independently H or alkyl, and $R^3$ is $C_2$-$C_4$ alkylene which can be branched or unbranched.

23. A process, comprising combining a fluorovinyl ether functionalized aromatic diester or diacid with a $C_2$-$C_4$ alkylene glycol, branched or unbranched, and a catalyst to form a reaction mixture; and stirring the reaction mixture to form a polymer comprising repeat units having the structure (I) according to claim 1, wherein the fluorovinyl ether functionalized aromatic diester or diacid is represented by the structure (III),

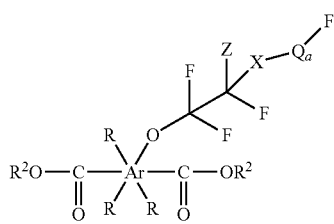

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

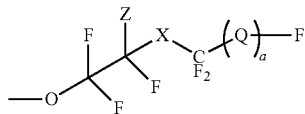

with the proviso that only one R can be OH or the radical represented by the structure (II);

$R^2$ is H or $C_1$-$C_{10}$ alkyl;
X is O or $CF_2$;
Z is H, Cl, or Br;
a=0 or 1;
and,
Q represents the structure (Ia)

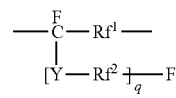

wherein q=0-10;
Y is O or $CF_2$;
$Rf^1$ is $(CF_2)_n$, wherein n is 0-10;
and,
R is $(CF_2)_p$, wherein p is 0-10, with the proviso that when p is 0, Y is $CF_2$.

24. The process of claim 23 wherein each R is H.
25. The process of claim 23 wherein one R is reperesented by the structure (H) and the remaining two Rs are each H.
26. The process of claim 23 wherein X is O.
27. The process of claim 23 wherein X is $CF_2$.
28. The process of claim 23 wherein Y is O.
29. The process of claim 23 wherein Y is $CF_2$.
30. The process of claim 23 wherein Z is Cl.
31. The process of claim 23 wherein $Rf^1$ is $CF_2$.
32. The process of claim 23 wherein $Rf^2$ is $CF_2$.
33. The process of claim 23 wherein p=0, and Y is $CF_2$.
34. The process of claim 23 wherein a=0.
35. The process of claim 23 wherein a=1, q=0, and n=0.
36. The process of claim 23 wherein the reaction mixture further comprises an aromatic diester or aromatic diacid represented by the structure (VI)

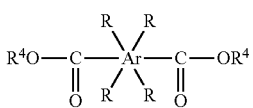

wherein Ar is a benzene or naphthalene radical, $R^4$ is H or $C_1$-$C_{10}$ alkyl, and each R is independently H or $C_1$-$C_{10}$ alkyl.

37. The process of claim 23 wherein a=1, each R is H, Z is Cl, $R^2$ is methyl, X is O, Y is O, $Rf^1$ is $CF_2$, $Rf^2$ is perfluoropropenyl, and q=1.

* * * * *